(12) United States Patent
He et al.

(10) Patent No.: US 9,866,757 B2
(45) Date of Patent: Jan. 9, 2018

(54) COMPUTER PROGRAM, SYSTEM, AND METHOD FOR OBSERVATION AND COMMUNICATION FOR MOBILE SETTINGS, MOBILE APPLICATIONS, AND WEARABLE MOBILE DEVICES

(71) Applicant: Wichita State University, Wichita, KS (US)

(72) Inventors: Jibo He, Wichita, KS (US); Barbara Chaparro, Bel Aire, KS (US)

(73) Assignee: Wichita State University, Witchita, KS (US)

( * ) Notice: Subject to any disclaimer, the term of this patent is extended or adjusted under 35 U.S.C. 154(b) by 0 days.

(21) Appl. No.: 15/521,692

(22) PCT Filed: Oct. 27, 2015

(86) PCT No.: PCT/US2015/057564
§ 371 (c)(1),
(2) Date: Apr. 25, 2017

(87) PCT Pub. No.: WO2016/069588
PCT Pub. Date: May 6, 2016

(65) Prior Publication Data
US 2017/0251148 A1    Aug. 31, 2017

Related U.S. Application Data

(60) Provisional application No. 62/069,005, filed on Oct. 27, 2014.

(51) Int. Cl.
*H04N 7/18*          (2006.01)
*H04N 5/232*         (2006.01)
(Continued)

(52) U.S. Cl.
CPC ..... *H04N 5/23293* (2013.01); *G02B 27/0172* (2013.01); *G02B 27/0176* (2013.01);
(Continued)

(58) Field of Classification Search
CPC ............ H04N 5/23293; H04N 5/4403; H04N 5/44504; G02B 27/0172; G02B 27/0176
(Continued)

(56) References Cited

U.S. PATENT DOCUMENTS

2012/0275765 A1   11/2012   Ikeda et al.
2013/0242262 A1    9/2013   Lewis
2014/0295786 A1   10/2014   Maier et al.

OTHER PUBLICATIONS

International Search Report and Written Opinion in corresponding PCT Application Serial No. PCT/US15/57564, dated Jan. 12, 2016 (8 pages).

*Primary Examiner* — Mehrdad Dastouri
*Assistant Examiner* — Kristin Dobbs
(74) *Attorney, Agent, or Firm* — Hovey Williams LLP

(57) ABSTRACT

A system including at least first and second wearable mobile devices and optionally one or more smartphones or other computing devices for allowing a wearable mobile device wearer, an on-site observer, and a remote observer to research and test usability of products in mobile settings, mobile applications, mobile devices, and wearable mobile devices, desktop usability settings, and other settings and devices. The devices nm a software application for generating first-person video and third-person video, transmitting the video to the other devices, marking the videos with time stamps, and allowing the remote observer to send messages and other information to the other devices.

19 Claims, 4 Drawing Sheets

(51) Int. Cl.
*H04N 5/445* (2011.01)
*H04N 5/44* (2011.01)
*G02B 27/01* (2006.01)

(52) U.S. Cl.
CPC ....... *H04N 5/4403* (2013.01); *H04N 5/44504* (2013.01); *H04N 7/181* (2013.01); *G02B 2027/0138* (2013.01); *H04N 2005/441* (2013.01)

(58) Field of Classification Search
USPC .......................................................... 348/159
See application file for complete search history.

COMPUTER PROGRAM, SYSTEM, AND METHOD FOR OBSERVATION AND COMMUNICATION FOR MOBILE SETTINGS, MOBILE APPLICATIONS, AND WEARABLE MOBILE DEVICES

RELATED APPLICATIONS

This application is the National Stage of International Patent Application No. PCT/US2015/057564, filed Oct. 27, 2015, which claims the priority benefit with regard to all common subject matter of earlier-filed U.S. Provisional Patent Application Ser. No. 62/069,005 filed on Oct. 27, 2014 and entitled "COMPUTER PROGRAM, SYSTEM, AND METHOD FOR OBSERVATION AND COMMUNICATION FOR MOBILE SETTINGS, MOBILE APPLICATIONS, AND WEARABLE MOBILE DEVICES", each of which is hereby incorporated by reference in its entirety into the present application.

BACKGROUND

Usability testing and analysis is an empirical method of measuring a product's ease of use with prospective end users. For software or website usability analysis, usability researchers typically use custom software tools to gather information such as time spent on a task, mouse clicks, keyboard inputs, and subjective comments from end users. Programs for desktop computer usability research include Morae™, Camtasia™, Surflogger™ and other programs. Conventional webcams are also used to monitor user behavior and capture user comments. These tools are not, however, suitable for performing usability research of the use of products in mobile settings, mobile devices such as smartphones, wearable mobile devices, and other products. For example, conventional webcams are difficult to use and/or attach to wearable mobile devices and are unable to capture information from the user's point of view. Thus, usability research of products in mobile settings, mobile devices, and wearable mobile devices is more difficult using presently-available technology.

SUMMARY

Embodiments of the present invention solve the above-mentioned problems and provide a distinct advance in the art of researching the use of and testing products in mobile settings, mobile devices such as smartphones, and wearable mobile devices such as Google Glass™.

One embodiment of the present invention is a method of performing usability research. The method includes a first user donning a first wearable mobile device. The wearable mobile device may include a frame, a processor for running a usability research application in a wearer mode, a camera, a microphone, a display, and a transceiver. The method further includes performing a task or series of tasks via the first user and generating live first-person video of the first user performing the task or series of tasks via the camera of the first wearable mobile device. The live first-person video may be transmitted to other computing devices running the usability research application in an on-site observer mode and/or a remote observer mode.

Another embodiment of the present invention is a system for performing usability research. The system may include a first wearable mobile device, a second wearable mobile device, and a remote mobile device. The first wearable mobile device may include a frame, a processor for running a usability research application in a wearer mode, a camera for capturing live first-person video of a first user performing a task or series of tasks, a microphone, a display, and a transceiver for transmitting the live first-person video to the second wearable mobile device and the remote mobile device. The second wearable mobile device may be similar to the first wearable mobile device except that its processor may run a usability research application in an on-site observer mode and its camera may capture live third-person video of the first user performing the task or series of tasks. The display of the second wearable mobile device may display the live first-person video received from the first wearable mobile device. The transceiver of the second wearable mobile device may transmit the live third-person video to the remote mobile device. The remote mobile device may include a processor for running the usability research application in a remote observer mode, a transceiver, and a display. The display may display the live first-person video received from the first wearable mobile device and the live third-person video received from the second wearable mobile device.

Yet another embodiment of the present invention is another system for performing usability research. The system may include a first wearable mobile device, a second wearable mobile device, and a remote mobile device. The first wearable mobile device may include a frame, a processor for running a usability research application in a wearer mode, a camera for capturing live first-person video of a first user performing a task or series of tasks, a microphone, a display, and a transceiver for transmitting the live first-person video to the second wearable mobile device and the mobile device. The second wearable mobile device may be similar to the first wearable mobile device except that its processor may run the usability research application in an on-site observer mode and its camera may capture live third-person video of the first user performing the task or series of tasks. The display of the second wearable mobile device may display the live first-person video received from the first wearable mobile device. The transceiver of the second wearable mobile device may transmit the live third-person video to the remote mobile device. The remote mobile device may include a processor for running the usability research application in a remote observer mode, a transceiver, and a display. The display of the remote mobile device may display the live first-person video received from the first wearable mobile device and the live third-person video received from the second wearable mobile device. The remote mobile device may also receive text inputs from a remote observer and the transceiver of the remote mobile device may transmit the text inputs as text messages to the second wearable mobile device.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
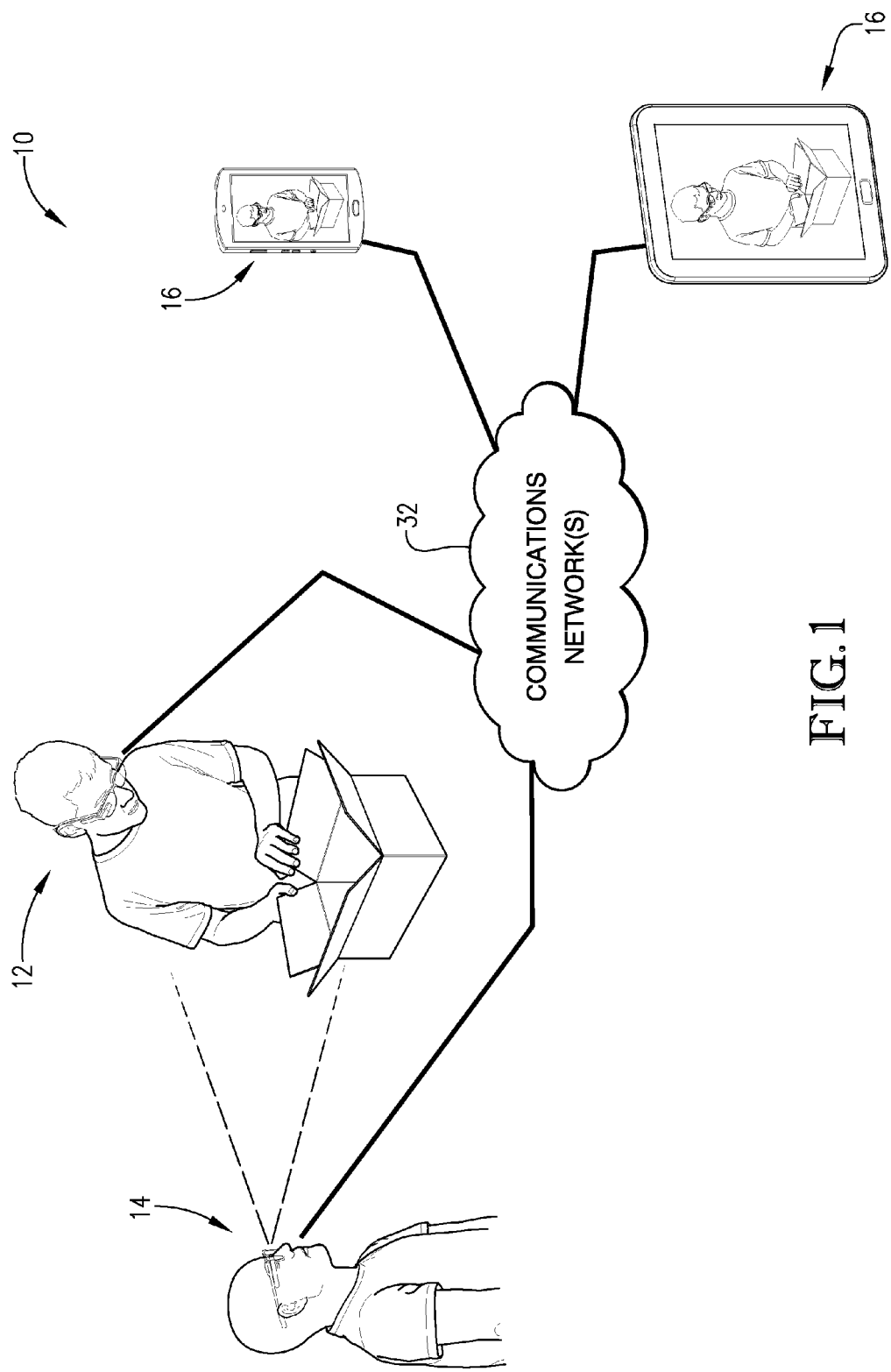
FIG. 1 is a schematic view of a system constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

The present invention provides a system and a method for performing usability research and testing of products in mobile settings and performing usability research and testing of mobile devices and wearable mobile devices such as but not limited to Google Glass™, HoloLens™ etc. The present invention allows a wearer to test a product, perform a task, and/or use a wearable mobile device and allows an on-site observer to observe and record the wearer in real time. The present invention also allows a remote observer to assist and communicate with the on-site observer. The present invention may also be used for interactive education, training, medical applications, and any other setting in which a first user is performing hands-on tasks with observers viewing the first user performing the tasks, providing feedback to the first user, and collecting data.

Figure 2:
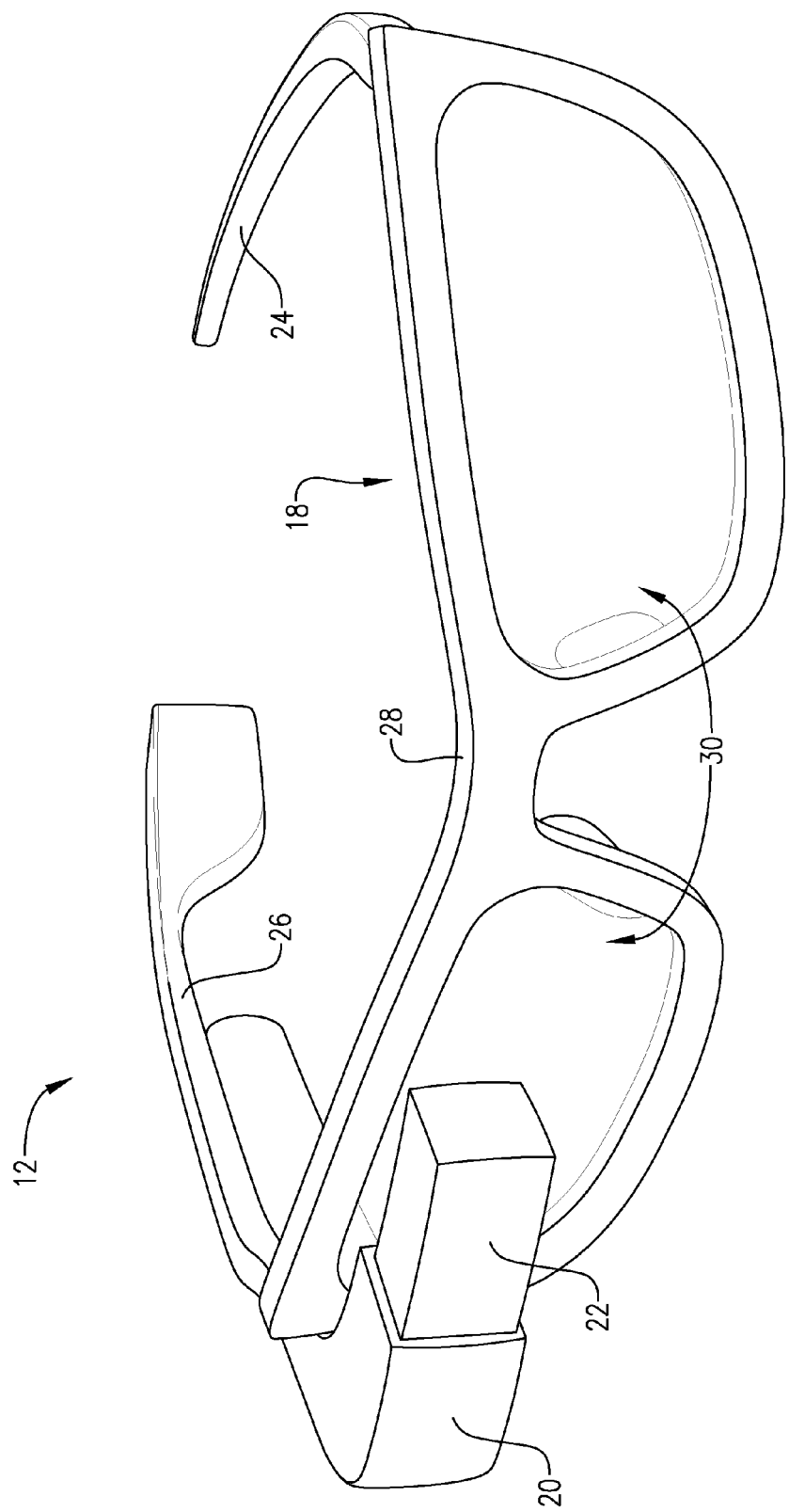
FIG. 2 is a perspective view of a wearable mobile device as used in the system of FIG. 1.

FIGS. 1 and 2 illustrate a system 10 according to embodiments of the present invention, with the system 10 comprising at least first and second wearable mobile devices 12, 14 and, optionally, one or more smartphones, tablets, computers, smartwatches or other remote devices 16.

The first wearable mobile device 12 may be a Google Glass™, Meta™ Pro, Vuzix® Smart Glasses, Optinvent™ Ora-S AR™ glasses, Recon Jet™ glasses, GlassUp™, Epiphany Eyewear™, Microsoft HoloLens™, Telepathy On™, Sony® Glass, Samsung® Glass, Looxcie™ LX2 Wearable Video Cam, a webcam, computer goggles, or any other device that is configured to be worn on or near the wearer's face such as over the wearer's eye or in the wearer's ear. As shown in FIG. 2, the first wearable mobile device 12 may include a frame 18, a processor, a memory, a camera 20, a microphone, a display 22, a power source, a transceiver, and other computing components such as manual inputs (e.g., buttons, nobs, dials, and switches), an accelerometer, a proximity sensor, a pressure sensor, a vibration sensor, and the like.

The frame 18 allows the first wearable mobile device 12 to be donned on the wearer's head (e.g., a first user) and may include left and right members 24, 26 for supporting the first wearable mobile device 12 on the wearer's ears and a bridge 28 for supporting the frame 18 on the wearer's nose. The frame 18 may also include transparent lenses 30. The lenses 30 may be prescription lenses, generic corrective lenses, bifocals, trifocals, sunglass lenses, or non-altered lenses.

The processor may comprise any number and combination of processors, controllers, integrated circuits, programmable logic devices, or other data and signal processing devices for carrying out the functions described herein, and may additionally comprise one or more memory storage devices, transceivers, receivers, and/or communication busses for communicating with the various devices of the system.

In embodiments of the invention, the processor may implement an application or computer program to perform some of the functions described herein. The application may comprise a listing of executable instructions for implementing logical functions in the wearable mobile device 12. The application (described in more detail below) can be embodied in any computer readable medium for use by or in connection with an instruction execution system, apparatus, or device, and execute the instructions including the wearable mobile devices 12, 14 and the remote mobile device 16. The various actions and calculations described herein as being performed by or using the application may actually be performed by one or more computers, processors, or other computational devices, independently or cooperatively executing portions of the application.

The memory may be any computer-readable medium that can contain, store, communicate, propagate, or transport the application for use by or in connection with the system 10 or wearable mobile device 12. The computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof.

The camera 20 records visual information and may be a still-frame camera or video recording device. The camera 20 may be mounted on the frame 18 near the wearer's eye for capturing video and/or images from the wearer's point of view.

The microphone records audio information and may be mono, stereo, and/or directional. The microphone may be positioned close to the camera 20 to record audio that matches up with the recorded video.

The display 22 allows the wearer to view displayed information within the wearer's view and may be a transparent lens or small screen extending from the frame 18 into the wearer's view. The display 22 may be an electronic display configured to display text, graphics, images, videos, or the like.

The power source may be a battery, battery pack, or connectable cord for plugging the first wearable mobile device 12 into a wall outlet or auxiliary electronic device.

The transceiver may be an antenna, wire connection, or any other electronic component for transmitting and receiving external signals between computing devices.

The second wearable mobile device 14 may include components substantially similar to the first wearable mobile device 12 such as a frame, a processor, a memory, a camera, a microphone, a display, a power source, a transceiver, and other computing components. For example, the second wearable mobile device 14 may be a Google Glass™, Meta™ Pro, Vuzix® Smart Glasses, Optinvent™ Ora-S AR™ glasses, Recon Jet™ glasses, GlassUp™, Epiphany Eyewear™, Telepathy On™, Sony® Glass, Samsung® Glass, Looxcie™ LX2 Wearable Video Cam, a webcam, computer goggles, or any other device that is worn on or near the on-site observer's face.

The remote mobile device 16 may be any portable electronic device such as an iPhone™, Android™, Windows® phone, or similar cellular phone, a handheld music device such as an iPod, a handheld computing device such as a personal digital assistant (PDA) tablet, or laptop, or a smartwatch such as an Apple® iWatch™, Moto 360™, Sumsung® Gear 1 or 2, or any other smartwatch or wrist device may be used. The tablet may be any device such as an iPad™, Kindle Fire™, Surface™, or similar tablet device. Alternatively, a desktop computer or other workstation such as a personal computer, mac computer, laptop, Ubuntu, or Macbook™ may be used. The remote mobile device 16 may have a processor, memory, camera, microphone, display, power source, and transceiver similar to the components described above (except that the display may be a more conventional electronic display screen or touch screen).

The above-described devices 12, 14, 16 may communicate over a wired or wireless network 32 such as the Internet, an intranet, "wifi" connection, cellular network (e.g., 3G or 4G), near field communication (NFC) technology, Bluetooth®, hotspot, direct wifi, HDMI, or similar communications networks.

Figure 3:
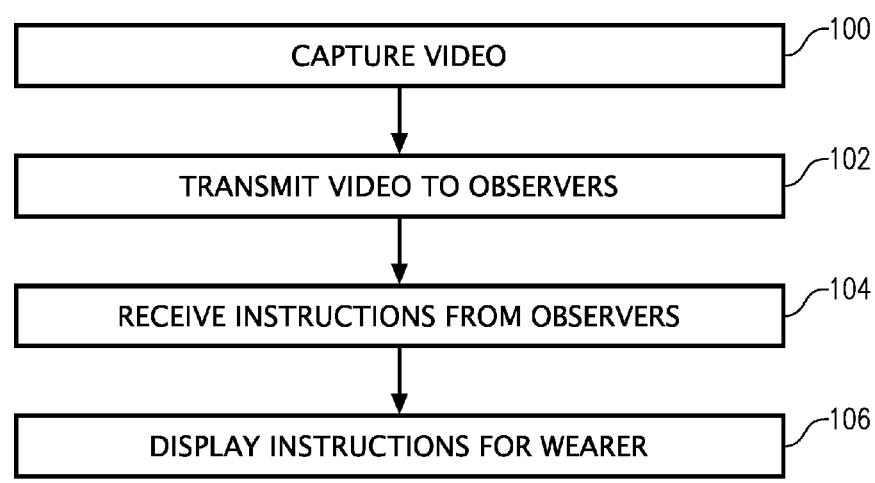
FIG. 3 is a flow chart of a wearer mode as manifested in embodiments of the present invention.
Figure 4:
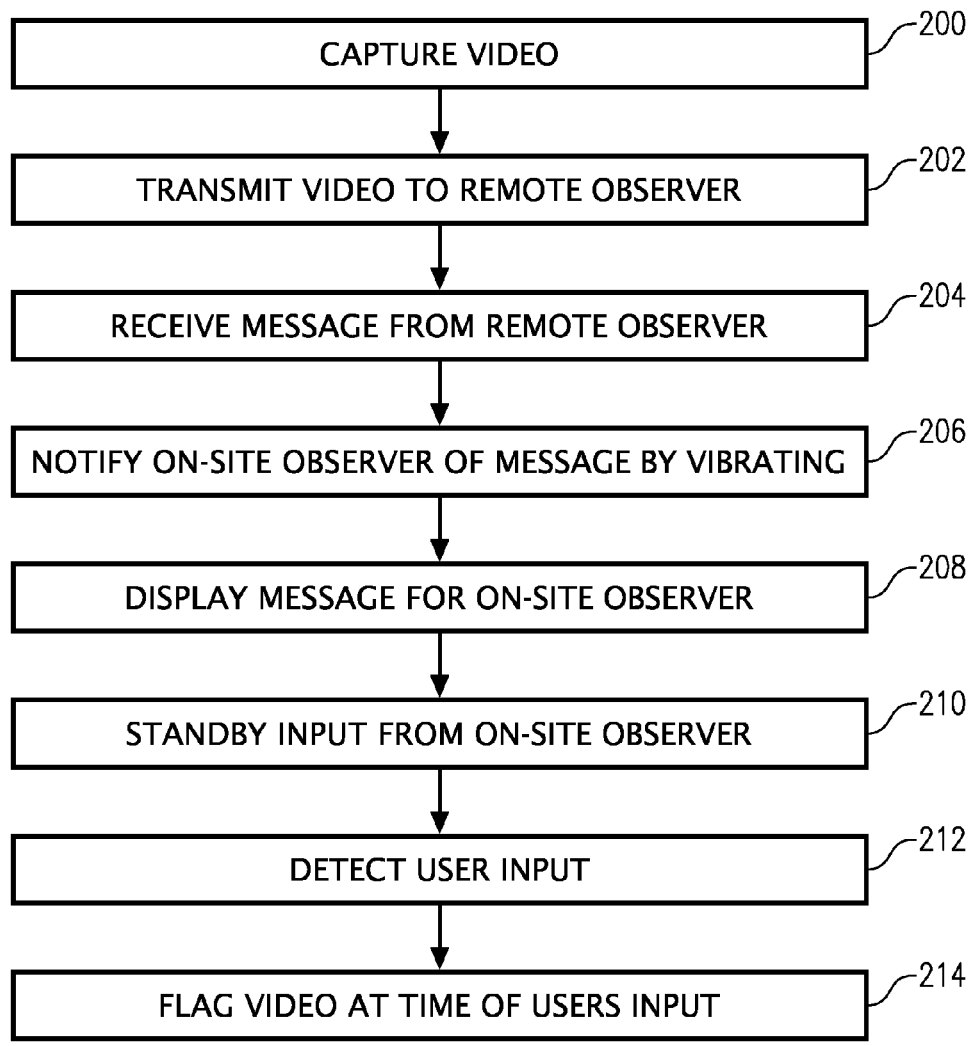
FIG. 4 is a flow chart of an on-site observer mode as manifested in embodiments of the present invention.
Figure 5:
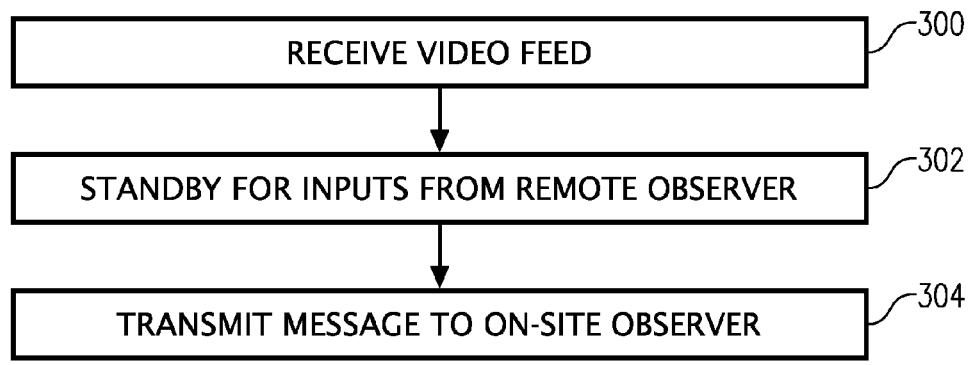
FIG. 5 is a flow chart of a remote observer mode as manifested in embodiments of the present invention.

Turning to FIGS. 3-5, the application will now be described in more detail. The application may be used in three modes: wearer mode, on-site observer mode, and remote observer mode.

In a wearer mode, the application (on the first wearable mobile device 12) may instruct the camera 20 to capture first-person video, as shown in block 100 of FIG. 3. For example, the first-person video may be footage of the wearer of the first wearable mobile device 12 performing a task from the wearer's point of view such as opening a package (see FIG. 1).

The application on the first wearable mobile device 12 may then instruct the transceiver of the first wearable mobile device 12 to transmit the first-person video to the second wearable mobile device 14 of the on-site observer and/or the remote mobile device 16 of the remote observer via the network 32, as shown in block 102. In this way, the on-site observer and/or the remote observer may view the first-person video in real time.

The application on the first wearable mobile device 12 may also receive instructions, messages, or other communications from the second wearable mobile device 14 and/or the remote mobile device 16 of the remote observer via the network 32, as shown in block 104. The messages may be Short Message Service (SMS) text messages, emails, or the like. For example, the application may receive a text message from the on-site observer asking the wearer of the first wearable mobile device 12 if he is familiar with the task he is being asked to perform.

The application on the first wearable mobile device 12 may then instruct the display 22 to display the instructions, messages, or other communications on the first wearable mobile device 12, as shown in block 106. For instance, the instructions may request that the wearer of the first wearable mobile device 12 perform a particular action (e.g., open the package shown in FIG. 1). In this way, the wearer of the first wearable mobile device 12 may communicate with the on-site observer and the remote observer while performing the task, as described above.

In an on-site observer mode, the application (on the second wearable mobile device 14) may instruct the camera of the second wearable mobile device 14 to capture third-person video from the perspective of the on-site observer of the wearer of the first wearable mobile device 12 performing the above action, via the camera of the second wearable mobile device 14, as shown in block 200 of FIG. 4. That is, the third-person video may include footage of the wearer of the first wearable mobile device 12 performing the above action, thus capturing visual data that the first-person video generated by the first wearable mobile device 12 may not have captured.

The application on the second wearable mobile device 14 may then instruct the transceiver of the second wearable mobile device 14 to transmit the third-person video to the remote mobile device 16 of the remote observer via the network 32, as shown in block 202. In this way, the remote observer may view and/or manipulate the third-person video via the mobile device 16.

The application on the second wearable mobile device 14 may also receive instructions, messages, or other communications (e.g., SMS text messages or emails) from the remote mobile device 16 of the remote observer via the network 32, as shown in block 204. For example, a received text message could be a request for the on-site observer to ask the wearer of the first wearable mobile device 12 a specific question or to instruct the wearer of the first wearable mobile device 12 to perform an action. In this way, the remote observer or another user may interact with the wearer of the first wearable mobile device 12 as if he was present (e.g., on-site).

The application on the second wearable mobile device 14 may notify the on-site observer of incoming messages by instructing the second wearable mobile device 14 to vibrate, play a sound, display an image, or present an alert, as shown in block 206. For example, the second wearable mobile device 14 may display an alert that the remote observer has sent a text message to the on-site observer.

The application on the second wearable mobile device 14 may then instruct the display of the second wearable mobile device 14 to display the messages for the on-site observer to view, as shown in block 208. The application may automatically display the text message on the display of the second wearable mobile device 14 along with the alert.

The application on the second wearable mobile device 14 may standby (i.e., "listen") for an input from the on-site observer such as the on-site observer tapping on the second wearable mobile device 14, as shown in block 210. The application may also standby for an input received via a button, knob, switch, proximity sensor, pressure sensor, accelerometer, or other component of the second wearable mobile device 14.

The application on the second wearable mobile device 14 may then detect any input such as the tap in block 210, as shown in block 212. For example, the application may detect the on-site observer's tap via its vibration sensor or proximity sensor.

The application on the second wearable mobile device 14 may log, flag, or mark the video or create a time stamp at the moment of detecting the input, as shown in block 214. The time stamp may represent a point or event of interest or a useful reference point. The time stamp may be recorded in a log file and the flag (e.g., tap label) may be inserted into the video file at the end of the recording. In this way, the observers can later jump to the flagged points or events of interest on the video when reviewing the video at a later time. The first-person video and the third-person video may be synchronized so that the observers may view the two or more corresponding videos at the same time.

In remote observer mode, the application (on the remote mobile device 16 of the remote observer) may receive the first-person video from the first wearable mobile device 12 and/or the third-person video from the second wearable mobile device 14 via the network 32, as shown in block 300 of FIG. 5. The IP address of the first wearable mobile device 12 may be appended to the video or video feed for the application on the remote mobile device 16 to play the video or video feed.

The application on the remote mobile device 16 may standby (i.e., "listen") for inputs such as a text entry or a spoken prompt from the remote observer, as shown in block 302. For example, the text entry can be the request for the on-site observer to ask the specific question to the wearer of the first wearable mobile device 12, as described above. The application on the remote mobile device 16 may also standby for an input received via a button, knob, switch, proximity sensor, pressure sensor, accelerometer, or other component of the remote mobile device 16.

The application on the remote mobile device 16 may then transmit the text entry as a text message to the second wearable mobile device 14 via the network 32, as shown in block 304. Text messages sent this way may be archived or saved. In this way, the remote observer may communicate with the wearer of the first wearable mobile device 12 and the on-site observer while documenting the conversation.

The first-person video, third-person video, text messages, and other data and information may be recorded and stored in a memory of the first or second wearable mobile devices 12, 14, the remote mobile device 16, and/or any other computing device connected via the network 32 for later review. The log file may be stored with the videos so that application may selectively shift to the events of interest or reference points when the recordings of the videos are watched.

The present invention provides many advantages and benefits. For example, the present invention allows a wearable mobile device wearer and an on-site observer to see from the wearer's perspective at virtually the same time. The present invention captures more useful video footage particularly in usability testing of products in mobile settings. The on-site observer can also easily log an event of interest by touching a button or stem on his or her wearable mobile device. The present invention eliminates the need for an extra person to operate an on-site observation camera. The application allows the on-site observer to communicate via text message chats in a head-mounted display in his line of sight instead of switching between observing the wearer and communicating via the text messages. The present invention also allows the video to be analyzed without specialized software. The present invention can also be used in many fields such as teleconferencing, medical settings, professional settings, agriculture, and other settings.

In another embodiment of the present invention, the first wearable mobile device 12 may be mounted on an object being tested or an observation object instead of a wearer. For example, the first wearable mobile device 12 may be mounted on a vehicle, robot, crane, helmet, weapon, drone, or extension device such as a cable, extension arm, boom, or any other device for providing a first-person view from the perspective of the object. In this way, the on-site observer and the remote observer can perform visual research from the object's point of view as the object moves and/or operates.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of performing usability research, the method comprising the steps of:
 donning a first wearable mobile device via a first user, the first wearable mobile device comprising:
  a frame for supporting the first wearable mobile device on the first user's face;
  a processor configured to run a usability research application in a wearer mode;
  a camera mounted on the frame for capturing first-person video from the first user's perspective;
  a microphone mounted on the frame for capturing audio corresponding to the first-person video;
  a display for displaying images and information; and
  a transceiver for communicating over a network with other computing devices running the usability research application in an on-site observer mode and/or a remote observer mode;
 performing a task or series of tasks via the first user;
 generating live first-person video of the first user performing the task or series of tasks via the camera of the first wearable mobile device and the usability research application operating in the wearer mode; and
 transmitting the live first-person video over the network for reception by the other computing devices,
further comprising the steps of:
 donning a second wearable mobile device via a second user, the second wearable mobile device comprising:
  a frame for supporting the second wearable mobile device on the second user's face;
  a processor configured to run the usability research application in an on-site observer mode;
  a camera mounted on the frame of the second wearable mobile device for capturing third-person video from the second user's perspective;
  a microphone mounted on the frame of the second wearable mobile device for capturing audio corresponding to the third-person video;
  a display for displaying images and information; and
  a transceiver for communicating with other devices over the network;
 receiving the live first-person video from the first wearable mobile device;

displaying the live first-person video from the first wearable mobile device via the usability research application operating in the on-site observer mode;
generating live third-person video of the first user performing the task or series of tasks via the camera of the second wearable mobile device and the usability research application operating in the on-site observer mode; and
transmitting the live third-person video over the network for reception by other computing devices.

2. The method of claim 1, further comprising the steps of:
providing a mobile device via a third user, the mobile device comprising:
  a processor configured to run the usability research application in a remote observer mode;
  a display for displaying images and information; and
  a transceiver for communicating with the first and second wearable mobile devices over the network;
receiving the live first-person video from the first wearable mobile device and the live third-person video from the second wearable mobile device; and
displaying the live first-person video received from the first wearable mobile device and/or the live third-person video received from the second wearable mobile device via the display of the mobile device of the third user and the usability research application operating in the remote observer mode.

3. The method of claim 2, further comprising the steps of:
generating a message via the mobile device of the third user, the message comprising a request for the second user to ask the first user a question or a request for the second user to ask the first user to perform an action;
transmitting the message to the second wearable mobile device over the network; and
receiving the message via the second wearable mobile device.

4. The method of claim 3, further comprising the steps of displaying the message on the display of the second wearable mobile device.

5. The method of claim 4, wherein the message is a Short Message Service (SMS) text message.

6. The method of claim 3, further comprising the step of generating an alert via the second wearable mobile device for notifying the second user of incoming messages sent from the mobile device of the third user.

7. The method of claim 1, further comprising the step of recording the live first-person video and/or the live third-person video onto a memory of the first wearable mobile device, the second wearable mobile device, the mobile device of the third user, and/or a remote computer system.

8. The method of claim 7, further comprising the step of logging one or more time stamps of the live first-person video and/or the live third-person video.

9. The method of claim 8, wherein the step of logging one or more time stamps includes tapping a stem of the first or second wearable mobile device.

10. The method of claim 8, wherein the step of logging the one or more time stamps of the live first-person video and/or the live third-person video includes generating one or more time stamps corresponding to the time or times the one or more points of interest occur in the live first-person video and/or the live third-person video and storing the one or more time stamps on a memory of the first wearable mobile device, the second wearable mobile device, the mobile device of the third user, or a remote computer system.

11. The method of claim 10, further comprising the step of reviewing the recording of the live first-person video and/or the live third-person video by selectively shifting playback of the recording directly to a position or positions of the recording corresponding to the one or more time stamps.

12. The method of claim 11, further comprising synchronizing playback of the recording of the live first-person video and the recording of the live third-person video.

13. A system for performing usability research, the system comprising:
a first wearable mobile device comprising:
  a frame for supporting the first wearable mobile device on a first user's face;
  a processor configured to run a usability research application in a wearer mode;
  a camera mounted on the frame, the camera being configured to generate live first-person video of the first user performing a task or series of tasks;
  a microphone mounted on the frame for capturing audio corresponding to the first-person video;
  a display for displaying images and information; and
  a transceiver configured to transmit the live first-person video over a network;
a second wearable mobile device comprising:
  a frame for supporting the second wearable mobile device on a second user's face;
  a processor configured to run the usability research application in an on-site observer mode;
  a camera mounted on the frame of the second wearable mobile device, the camera of the second wearable mobile device being configured to generate live third-person video of the first user performing a task or series from the second user's perspective;
  a microphone mounted on the frame of the second wearable mobile device for capturing audio corresponding to the live third-person video;
  a transceiver configured to receive the live first-person video from the first wearable mobile device; and
  a display configured to display the live first-person video from the first wearable mobile device via the usability research application operating in the on-site observer mode; and
a remote mobile device comprising:
  a processor configured to run the usability research application in a remote observer mode;
  a transceiver configured to receive the live first-person video from the first wearable mobile device and the live third-person video from the second wearable mobile device; and
  a display configured to display the live first-person video from the first wearable mobile device and the live third-person video from the second wearable mobile device via the usability research application operating in the remote observer mode.

14. The system of claim 13, wherein the live first-person video and/or the live third-person video is configured to be recorded onto a memory of the first wearable mobile device, second wearable mobile device, remote mobile device, or a remote computer system.

15. The method of claim 13, wherein the first wearable mobile device, second wearable mobile device, and/or remote mobile device is configured to log one or more points of interest of the live first-person video and/or the live third-person video by generating one or more time stamps corresponding to a time or times the one or more points of interest occurred in the live video.

16. The method of claim 15, wherein the frames of the first and second wearable mobile devices each comprise a stem, the first and second wearable mobile devices being configured to generate one or more time stamps when a user taps on one of the stems.

17. The method of claim 14, wherein the applications of the first and second wearable mobile devices and the remote mobile device are configured to play the recording of the live video and selectively shift playback of the recording directly to one or more positions of the recording corresponding to the one or more time stamps.

18. The method of claim 13, wherein the remote mobile device is configured to generate a message comprising a request for the second user to ask the first user a question or a request for the second user to ask the first user to perform an action, the second wearable mobile device being configured to generate an alert for notifying the on-site user of incoming messages from the remote mobile device.

19. A system for performing usability research of mobile application and wearable mobile devices, the system comprising:
   a first wearable mobile device comprising:
      a frame for supporting the first wearable mobile device on a first user's face;
      a camera mounted on the frame for capturing first-person video;
      a microphone mounted on the frame for capturing audio corresponding to the first-person video;
      a display for displaying images and information; and
      a transceiver for communicating with other devices over a network,
   the first wearable mobile device running a mobile application for instructing the camera to capture the first-person video, instructing the microphone to capture the audio, instructing the display to display the images and information, and instructing the transceiver to transmit the first-person video and the audio over a network;
   a second wearable mobile device comprising:
      a frame for supporting the second wearable mobile device on a second user's face;
      a camera mounted on the frame for capturing third-person video of the first user;
      a microphone mounted on the frame for capturing audio corresponding to the third-person video;
      a display for displaying the first-person video from the first wearable mobile device; and
      a transceiver for communicating with the first wearable mobile device over a network;
   the second wearable mobile device running a mobile application for instructing the camera of the second wearable mobile device to capture the third-person video, instructing the microphone of the second wearable mobile device to capture the audio corresponding to the third-person video, instructing the display of the second wearable mobile device to display the first-person video from the first wearable mobile device, and instructing the transceiver of the second wearable mobile device to transmit the third-person video and the audio corresponding to the third-person video to other devices;
   a remote mobile device comprising:
      a display for playing the first-person video from the first wearable mobile device and the third-person video from the second wearable mobile device; and
      a transceiver for communicating with the first wearable mobile device and the second wearable mobile device over the network,
   the remote mobile device running a mobile application for receiving text inputs from the remote observer and instructing the transceiver of the remote mobile device to transmit the text inputs as text messages to the second wearable mobile device over the network.

\* \* \* \* \*